Patented Dec. 19, 1950

2,534,694

UNITED STATES PATENT OFFICE 2,534,694

PROCESS FOR THE INVERSION OF SUCROSE

William A. Blann, Stamford, Conn., assignor to American Cyanamid Company, New York, N. Y., a corporation of Maine No Drawing. Application September 23, 1946, Serial No. 698,859

5 Claims. (Cl. 127—41)

This invention relates to a catalytic process for the inversion of aqueous solutions containing sugar.

Previously, it has been customary to invert about 50% of the sucrose in sugar syrups where it is desirable that crystallization be prevented or inhibited. Such syrups are especially useful in the manufacture of confectionery products, bakery products, soft drinks, etc. This has generally been accomplished in the past with acid or by enzyme action, but both of these methods have certain disadvantages. If acid is used, a considerable amount of sugar is destroyed, whereas the enzyme process requires from about 16 to 30 hours or more under very carefully controlled conditions. My process, on the other hand, requires only a few minutes, and does not require the use of any free acid.

An object of the present invention is to provide a convenient and relatively quick method of inverting sugar.

Another object of my invention is to provide a method for inverting sugar which does not result in the decomposition of the sugar.

Still another object of the present invention is to provide sugar syrups containing a high proportion of invert sugar, and to do this by means of a process which at the same time will improve the color of the syrup.

These and other objects are attained by demineralizing a sugar juice or sugar syrup, and thereafter passing it through a hydrogen activated cation exchanger, one or more times, at a temperature of about 40–75° C. It is preferable that the syrup or juice to be inverted be as near free of cations and anions as possible before it is contacted with the cation exchanger where inversion is to take place. For optimum results, the total anions in the aqueous solution of sugar to be inverted should not be greater than about 50 P. P. M. (calculated as acids having an equivalent weight of 50). Inasmuch as the activity of the cation exchanger will be reduced markedly if there be any substantial amount of cations present, the cation content should be as low as economically feasible. Thus, I prefer that the total cation content of the total fluid to be treated be less than one-tenth of the exchange capacity of the cation exchange material used for the inversion.

The following examples in which the proportions are in parts by weight, except where otherwise indicated, are given by way of illustration and not in limitation.

EXAMPLE 1

A raw sugar cane juice is passed through an ion exchange purification system comprising two pairs of exchangers, the first of each pair being a cation exchanger and the second being an anion exchanger. The juice after this treatment has the following analysis:

| | |
|---|---|
| Brix | 9 |
| True purity percent | 80.61 |
| Reducing sugars do | 14.29 |
| Non-sugars (total) do | 5.1 |
| Acidity | 0.0 |
| Ash (as $CaCO_3$) percent | 0.05 |

The juice is recycled through a cation exchanger containing a resin prepared in accordance with Example 5 of Patent No. 2,372,233. One hundred gallons of this juice are circulated through the cation exchanger which contains about 4 cubic feet of material at an average rate of about 5 gallons per minute. The juice is also passed through a heat exchanger, so that the temperature can be gradually raised. The following table shows the results obtained:

Table I

| Sample | Accumulative Time, Minutes | Temperature, °C. | Apparent Purity, Per Cent | Acidity P. P. M. as $CaCO_3$ |
|---|---|---|---|---|
| Juice used | Before treatment | | 80.50 | None |
| Recycled | Before heating | 15 | 80.88 | 36.5 |
| #1 | 15 | 25 | 80.81 | 40.5 |
| #2 | 34 | 35 | 80.64 | 40.2 |
| #3 | 56 | 45 | 77.36 | 43.2 |
| #4 | 82 | 55 | 65.10 | 49.8 |
| #5 | 110 | 65 | 47.61 | 60.0 |
| #6 | 134 | 73 | 27.21 | 71.5 |
| #7 | 147 | 76 | 16.95 | 85.0 |

EXAMPLE 2

Seventy-five gallons of a neutral syrup obtained by dissolving raw sugar in water were passed through an ion exchange purification system, such as that described in Example 1. The syrup was then recycled through an ion exchange system comprising first a cation exchanger and secondly, an anion exchanger in order to reduce the ionizable impurities to the lowest possible point. The resulting syrup has a pH of about 5, and is entirely unbuffered. There was no measurable amount of cations, while the acidity was about 3.5 P. P. M. and the syrup about 41 Brix. The anion exchanger was removed from the system, and the syrup was heated as rapidly as possible to about 60° C., while being circulated through the cation exchanger. The flow rate averaged about 2 gallons per minute, and during the recycling, a control sample contained in a sealed container was subjected to the same temperature cycle by keeping it immersed in the circulating sugar syrup. The results are shown in the following table:

*Table II*

| Sample | Time and Temperature | Apparent Purity, percent | Acidity P. P. M. as CaCO₃ |
|---|---|---|---|
| Recycled through Anion Exchanger and Cation Exchanger. | 120 min. at 15° C. | 97.0 | 3.5 |
| Recycled Cation Exchanger Only. | 65 min. at 15° C. | 95.4 | |
| #1 | 37 min. to 40° C. | 95.3 | |
| #2 | 60 min. to 60° C. | 83.7 | |
| #3 | 90 min. at 60° C. | 65.0 | |
| #4 | 120 min. at 60° C. | 59.4 | |
| #5 | 130 min. at 60° C. | 49.1 | 51.0 |
| Control not recycled through cation exchanger. | Same time and Temperature Cycle. | 96.7 | |

Additional inversion could be obtained by increasing the temperature somewhat or by increasing the time of contact, but generally it is desired to obtain syrups having about 50% purity for use in the liquid sugar field where it is desired that crystallization be prevented.

EXAMPLE 3

A sugar syrup of 60 Brix obtained by dissolving raw sugar in water is first purified by means of an ion exchange purification system, comprising two pairs of ion exchangers, the first one of which is a cation exchanger and the other being an anion exchanger. The resulting syrup has a purity of 94.8%, and substantially no cations. This syrup is passed through a bed of cation active material containing about 6 cubic feet of a resin prepared generally in accordance with Patent No. 2,228,159. The syrup is passed through at an average rate of 1.5 gallons per minute at a temperature of about 150° F. for about 20 hours. The effluent syrup has an average purity of about 46.6%.

Examples of suitable cation active materials which may be operated on the hydrogen cycle are: aldehyde condensation products of alpha-furyl substituted organic sulfonates such as those disclosed in U. S. Patent No. 2,373,152, polyhydric phenolaldehyde condensation products such as the catechol-tannin-formaldehyde condensation products, aromatic sulfonic acid-formaldehyde condensation products (as described in U. S. Patent No. 2,204,539), the carbonaceous zeolites, i. e., the sulfated or sulfonated carbonaceous materials such as coal, peat, lignite, etc. Any of these materials may be operated on the hydrogen cycle, and they are, therefore, suitable for use in accordance with my invention. Broadly speaking, these substances may be termed "hydrogen zeolites." The activation of the cation active materials with an acid and the exchange or reaction of the hydrogen ion of said acid during the purification process is known as "the hydrogen cycle."

Cation active materials may be regenerated or activated by passing dilute acid solutions, e. g., 0.1–10% of hydrochloric acid, sulfuric acid, etc., through the bed and subsequently washing with water until substantially free of the acid used. The cation active resins are then said to be "hydrogen activated."

While my process is particularly applicable to the inversion of the juices which are derived from sugar cane or sorghum or from syrups produced therefrom, it may also be used in connection with the inversion or any sucrose-containing solutions, including solutions made by dissolving relatively pure sucrose in water. Among the syrups which may be treated in accordance with my process, various grades of molasses, affination liquors and the various grades of the re-melted sugars are examples.

The rate of flow of the sugar solution to be inverted through the hydrogen zeolites may be adjusted to give the desired amount of inversion at the desired range of back pressure which is dependent on the design of the apparatus, as well as upon the viscosity of the liquid being treated.

While my invention has been described particularly in connection with a bed of ion exchange material, it is to be understood that the process may also be effected by agitating the syrup to be treated with the hydrogen zeolites at a temperature of 40–75° C., and after sufficient inversion has taken place, separating the hydrogen zeolites from the solution. This operation may be carried out either as a batch operation in a tank with an agitator, or it may be carried out as a continuous operation by circulating the solution in the same or in the opposite direction from the flow of the hydrogen zeolites.

As heretofore indicated, my process is carried out at temperatures between about 40–75° C., although, the optimum temperature appears to be at about 65° C., since this temperature gives a high rate of inversion with a low rate of conversion to non-sugars. As the temperature rises above 65° C., and more particularly, above 75° C., the destruction of sugars to non-sugars increases relatively rapidly, and in addition, the higher temperatures often cause decomposition of the hydrogen zeolites, particularly when of a resinous nature.

Obviously, many modifications and variations in the processes and compositions described above may be made without departing from the spirit and scope of the invention as defined in the appended claims.

I claim:

1. A process which comprises treating an aqueous solution containing sucrose and not more than 50 P. P. M. of anions calculated as acids having an equivalent weight of 50 and substantially no cations with a hydrogen zeolite at a temperature of about 40–75° C., the contact time of said solution with said zeolite being sufficient to invert at least a part of the sucrose.

2. A process which comprises demineralizing an aqueous solution of sucrose so that it contains no more than about 50 P. P. M. of anions calculated as acids having an equivalent weight of 50 and substantially no cations and thereafter contacting the solution with a hydrogen zeolite at a temperature of 40–75° C., the contact time of said solution with said zeolite being sufficient to invert at least a part of the sucrose.

3. A process which comprises demineralizing an aqueous solution containing sucrose by means of ion exchange materials, comprising a cation exchanger and an anion exchanger, to produce a solution having no more than about 50 P. P. M. of anions calculated as acids having an equivalent weight of 50 and substantially no cations and thereafter contacting the solution with a hydrogen zeolite at a temperature of about 65° C. for sufficient time to produce a solution having a sucrose to invert sugar ratio of about 1:1.

4. A process which comprises passing an aqueous solution containing sucrose and not more than 50 P. P. M. of anions calculated as acids having an equivalent weight of 50 and substantially no cations through a hydrogen zeolite at a temperature of about 40–75° C., said solution having a total cation content in the total solution treated of less than one-tenth of the exchange capacity of said hydrogen zeolite, the contact time of said solution with said zeolite being sufficient to invert at least a part of the sucrose.

5. The process which comprises demineralizing at substantially non-inverting temperature, an aqueous sucrose solution by contact with ion exchange materials comprising a cation exchanger and an anion exchanger in sequence and thereafter contacting the solution with an acid regenerated cation exchange material at a solution temperature sufficient to effect inversion of the sucrose.

WILLIAM A. BLANN.

REFERENCES CITED

The following references are of record in the file of this patent:

UNITED STATES PATENTS

| Number | Name | Date |
|---|---|---|
| 1,402,615 | Hughes | Jan. 3, 1922 |

FOREIGN PATENTS

| Number | Country | Date |
|---|---|---|
| 116,691 | Australia | Mar. 9, 1943 |

OTHER REFERENCES

Englis et al.: "Purification of a Palatable Artichoke Sirup," Ind. and Eng. Chem., July 1942, pages 864–867.

Hardy: "Purification and Acidification of Polysaccharide Solutions by Electricity," Ind. and Eng. Chem., Dec. 1933, page 1395.

Weitz: "Juice Purification by Ion Exchange as Applied at the Isabella Sugar Company," pages 26–31, "Sugar," Jan. 1943.

Gutleben: "Report on the Vallez Zeolite Process," Int. Sug. Jour., Jan. 1945, pages 11–13.